(12) United States Patent
Sugiyama et al.

(10) Patent No.: US 6,843,728 B2
(45) Date of Patent: Jan. 18, 2005

(54) TRIPOD TYPE CONSTANT-VELOCITY UNIVERSAL JOINT

(75) Inventors: Tatsuro Sugiyama, Shizuoka (JP); Humihiro Isobe, Shizuoka (JP); Haruo Nagatani, Shizuoka (JP)

(73) Assignee: NTN Corporation, Osaka (JP)

(*) Notice: Subject to any disclaimer, the term of this patent is extended or adjusted under 35 U.S.C. 154(b) by 0 days.

(21) Appl. No.: 10/278,832

(22) Filed: Oct. 24, 2002

(65) Prior Publication Data

US 2003/0083133 A1 May 1, 2003

(30) Foreign Application Priority Data

Oct. 26, 2001 (JP) ........................................ 2001-329335
Feb. 18, 2002 (JP) ........................................ 2002-040472

(51) Int. Cl.⁷ .............................................. F16D 3/205
(52) U.S. Cl. ...................................... 464/111; 464/905
(58) Field of Search ................................ 464/111, 167, 464/170, 905

(56) References Cited

U.S. PATENT DOCUMENTS

| 4,196,598 A | * | 4/1980 | Hirai et al. | ........... 464/111 |
| 5,460,573 A | * | 10/1995 | Krude | ........... 464/111 |
| 5,803,814 A | * | 9/1998 | Welschof | ........... 464/111 |
| 6,165,075 A | | 12/2000 | Kita et al. | |
| 2003/0045363 A1 | * | 3/2003 | Sugiyama et al. | ........... 464/111 |

FOREIGN PATENT DOCUMENTS

| GB | 2 000 573 | 1/1979 |
| JP | 64-5164 | 1/1989 |
| JP | 4-74565 | 11/1992 |
| JP | 2002-235769 | 8/2002 |

* cited by examiner

Primary Examiner—Greg Binda
(74) Attorney, Agent, or Firm—Wenderoth, Lind & Ponack, L.L.P.

(57) ABSTRACT

A tripod type constant-velocity universal joint is provided in which a tripod member is prevented from coming out of an outer ring. A guide block is supported on each trunnion of the tripod member mounted in the outer ring. Rolling elements are mounted between raceway grooves formed in both side faces of the guide blocks and raceway grooves formed in both sides of track grooves of the outer ring so that rolling elements will make a pure rolling movement over the entire moving range of the guide block. A lever is mounted to a plate portion of each retainer for retaining the rolling elements. Pins are inserted in a pair of guide grooves formed in the lever. One of the pins is secured to the outer ring and the other pin is secured to the guide block. A stopper ring is mounted to the open end of the outer ring, so that the stopper ring will prevent the rolling elements from coming out of the raceway grooves, thereby preventing the tripod member from coming out of the outer ring.

8 Claims, 13 Drawing Sheets

TRIPOD TYPE CONSTANT-VELOCITY UNIVERSAL JOINT

BACKGROUND OF THE INVENTION

This invention relates to a tripod type constant-velocity universal joint in which torque is transmitted between an outer ring, having three track grooves formed in the inner periphery thereof, and a tripod member mounted therein so as to be axially movable.

A tripod type constant-velocity universal joint is known which comprises an outer ring formed with three axially extending track grooves in its inner periphery, a tripod member mounted in the outer ring and having three trunnions formed thereon, cylindrical roller guide surfaces formed in side faces of each track groove so as to oppose each other in the circumferential direction of the outer ring, raceway grooves extending in the axial direction of the outer ring, and a spherical roller supported on each trunnion so as to be pivotable relative to the trunnion and received in the each track groove for transmitting a torque between the outer ring and the tripod member.

With this tripod type constant-velocity universal joint, when torque is transmitted with the tripod member taking a working angle relative to the outer ring, the center of rotation of the spherical roller is inclined relative to the lengthwise direction of its corresponding track groove. Thus, the spherical roller cannot make a pure rolling movement, so that slip occurs between the spherical roller and the roller guide surface in the track groove.

This increases the frictional resistance at a contact point between the spherical roller and the roller guide surfaces, and increases slide resistance when the outer ring and the tripod member move axially relative to each other. Therefore, vibration and noise are produced and the NVH (noise, vibration and harshness) properties worsen.

A tripod type constant-velocity universal joint of this type is proposed in JP patent publication 64-5164 to improve NVH properties. In this type of universal joint, three track grooves are formed in the inner periphery of the outer ring and raceway grooves extending in the axial direction of the outer ring are formed in both sides of each track groove, which raceway grooves oppose each other in a circumferential direction of the outer ring. Three trunnions are formed on the tripod member which is mounted in the outer ring. A guide block supported on each trunnion so as to be pivotable relative to the trunnion is received in a corresponding track groove. Balls are mounted between raceway grooves formed on both sides of each guide block and the raceway grooves formed in the outer ring to transmit torque between the outer ring and the tripod member through the balls.

In this tripod type constant-velocity universal joint, since the balls are mounted between the raceway grooves of the outer ring and the raceway grooves of the guide blocks, when torque is transmitted with the outer ring and the tripod member forming a working angle, the guide blocks move in an axial direction of the outer ring with their attitude kept constant. Since the balls always roll in contact with the raceway grooves as the tripod member moves relative to the outer ring, vibration and noise are extremely low, so that the NVH properties are good.

In the tripod type constant-velocity universal joint shown in the above said publication, portions for preventing the balls from falling off have to be provided at both ends of each raceway groove of the guide blocks. Thus, when the working angle between the outer ring and the tripod member is large, the balls cannot roll smoothly and slip occurs because the balls contact these fall-preventive portions, so that in a slip region, the NVH properties worsen.

In order to avoid this problem, in the constant-velocity universal joint described in JP patent publication 4-74565, a plurality of balls mounted between the raceway grooves of the guide blocks and the raceway grooves at both sides of the track grooves of the outer ring are retained by a retainer and the moving distance of movement of the retainer is restricted to half of the moving distance of the guide blocks by a moving distance restricting means so that the balls can always do a pure rolling motion.

With a conventional tripod type constant-velocity universal joint, it was sometimes impossible to cause a plurality of rolling elements to make a pure rolling movement over the entire moving range of the guide block when there is certain relationship between the required moving distance of the guide block, the number of the rolling members, the pitch between the rolling members, a length of the guide block and a length of the track groove of the outer ring.

The first object of the present invention is to provide a tripod type constant-velocity universal joint which has good NVH properties.

With this already proposed tripod type constant-velocity universal joint, since the tripod member is movable in the axial direction of the outer ring, during transportation or while mounting on an automobile, the tripod member may come off the outer ring. If the tripod member comes off, the rolling elements would fall off the retainer. Moreover, since the open end of the outer ring is closed by a boot, it is impossible to reassemble parts such as the tripod member.

The second object of this invention is to prevent the tripod member from falling in such a tripod type constant-velocity universal joint.

SUMMARY OF THE INVENTION

According to this invention, in order to meet the first object, there is provided a tripod type constant-velocity universal joint comprising an outer ring formed with three axially extending track grooves in an inner periphery thereof, a tripod member mounted in the outer ring and having three trunnions formed thereon so as to oppose the track grooves, raceway grooves formed in side faces of the each track groove opposing each other in a circumferential direction of the outer ring, with the raceway grooves extending in the axial direction of the outer ring, a guide block supported on the each trunnion so as to be pivotable relative to the trunnion and received in a corresponding track groove, with the guide block being formed with a raceway groove in side faces thereof, a plurality of rolling elements mounted between the raceway groove formed in side faces of the each guide block and each corresponding raceway groove of the outer ring, retainers for retaining the rolling elements, and a moving distance restricting means for restricting a moving distance of each retainer to half of the moving distance of a corresponding guide block, characterized in that the rolling elements are adapted to roll over an entire moving range in the axial direction of the outer ring.

By adapting that a plurality of the rolling elements will roll over the entire moving range of each guide block, a tripod type constant-velocity universal joint is provided which has good NVH properties.

By setting a length of each raceway groove of the outer ring and a length of each guide block to meet the following formula:

$$K=(n-1) \cdot A + L/2$$

$$B > A \text{ when } n=2, \; B > 2A \text{ when } n \geq 3$$

wherein
- a: Diameter of the rolling elements
- A: Pitch between the rolling elements
- B: Length of the guide block
- L: Required moving distance of the guide block
- K: Length of the track groove of the outer ring
- n: Number of rolling elements mounted in one raceway groove, a tripod type constant-velocity universal joint is provided which has good NVH properties and in which a plurality of rolling elements roll over the entire moving range of the guide block.

With the tripod type constant-velocity universal joint of this invention, each guide block generally requires a moving distance of at least 40 mm in view of a maximum operating angle and a radius from a center of the outer ring to a center of a corresponding rolling element. If the universal joint is designed with two rolling elements, lengths of the guide block and the outer ring would be too long and a total weight would increase. If the number of the rolling elements is larger than necessary, this would increase length of the rolling elements and weight of the universal joint. Thus it is preferable that the number of the rolling elements is three.

According to this invention, in order to meet the second object, a stoper ring is mounted to an open end of the outer ring to prevent the rolling elements from coming out of the outer ring.

By mounting the stopper ring to the open end of the outer ring, it is possible to prevent not only the rolling elements, but also the retainer, from coming out. By preventing the retainer from coming out, a lever provided as the moving distance restricting member is prevented from turning in one direction, so that a pin on the guide block is maintained engaged with a guide groove of the lever. Thus, it is possible to prevent the guide blocks and the tripod member from coming out of the open end of the outer ring.

The stopper ring has an annular plate portion abutting the open end of the outer ring, and a cylindrical portion provided on an outer periphery of the annular plate portion and fitted on the outer periphery of the open end of the outer ring. The annular plate portion is formed with cutouts at positions opposing open ends of the track grooves, and protrusions are provided on both sides of each cutout and inserted in the raceway grooves of the outer ring to prevent the rolling elements from coming out of the open ends of the track grooves.

In an arrangement in which a pin-forming piece is formed on an inner periphery of each cutout of the annular plate portion of the stopper ring so as to be inserted in each track groove, a pin secured to the outer ring is formed by pressing on each pin-forming piece.

By forming the stopper ring by pressing a metallic plate, it is possible to easily form the stopper ring, so that it is possible to reduce the cost of the tripod type constant-velocity universal joint.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Hereinbelow, the embodiments of this invention will be described with reference to the drawings.

Figure 1:
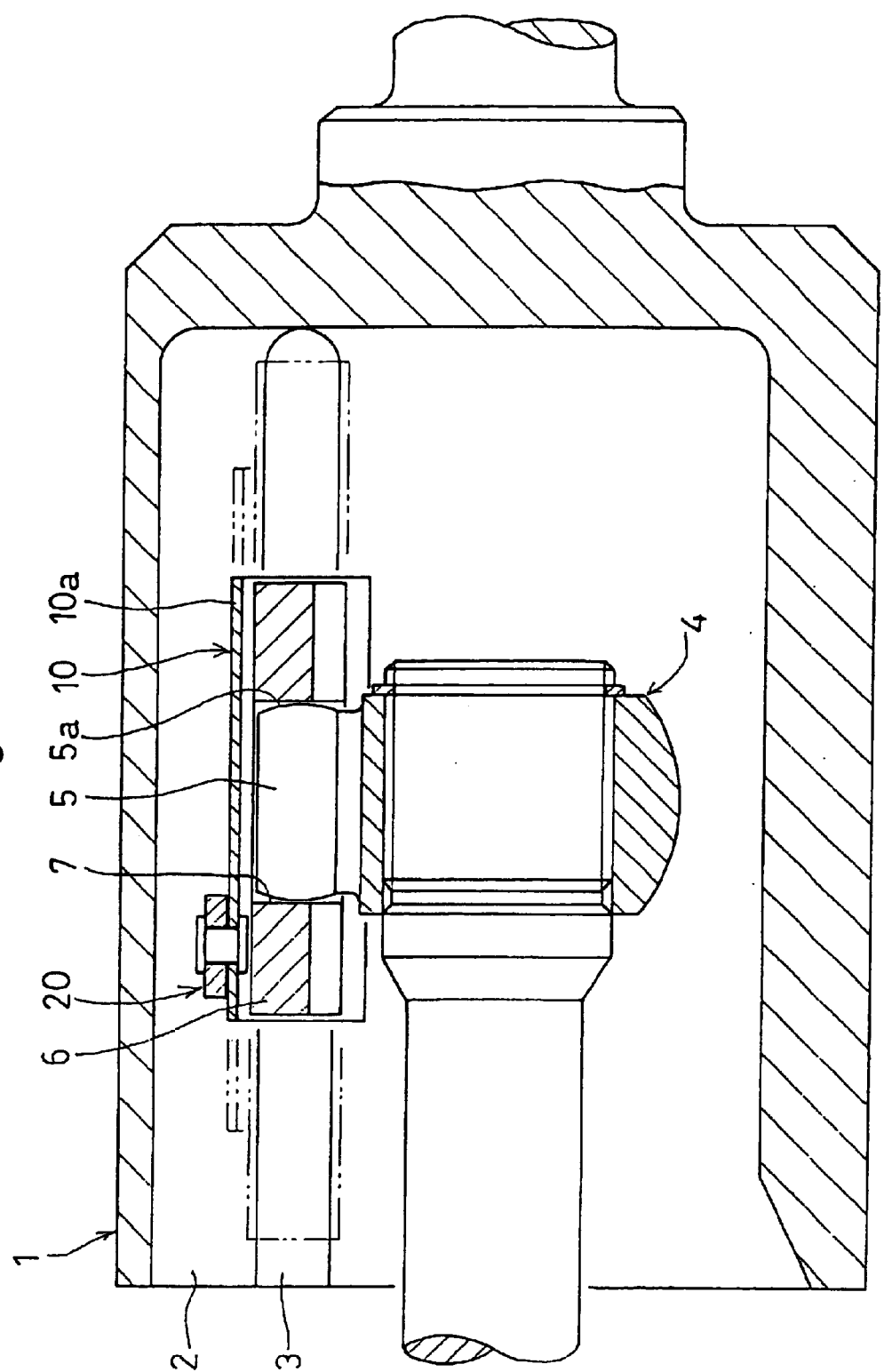
FIG. 1 is a vertical sectional front view of a tripod type constant-velocity universal joint embodying this invention.
Figure 2:
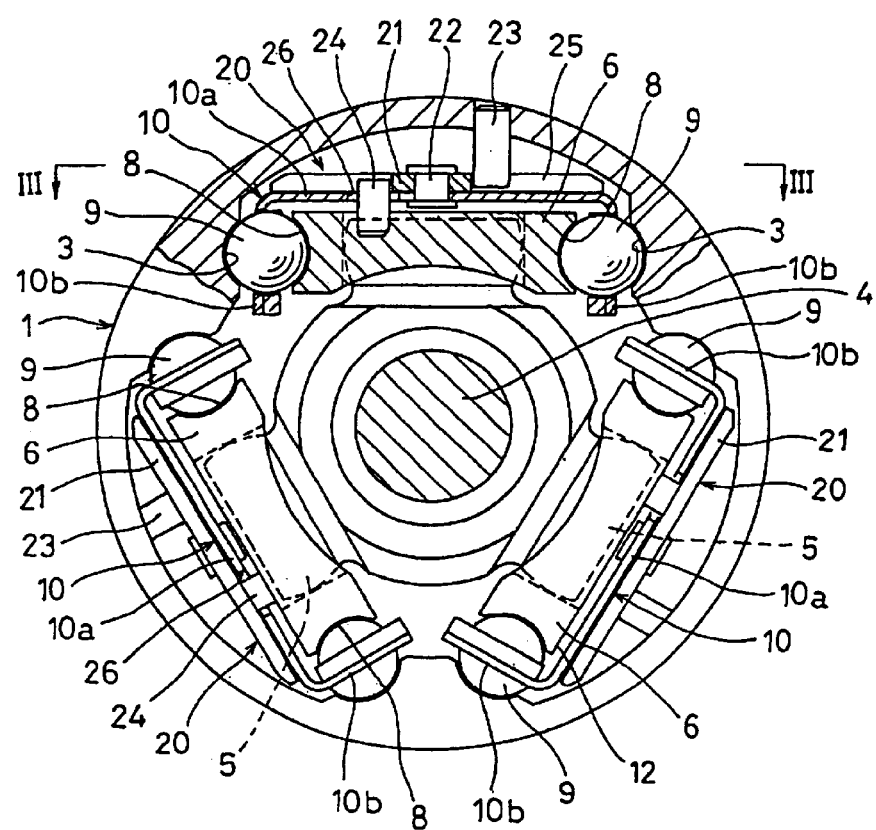
FIG. 2 is a partially cutaway side view of the tripod type constant-velocity universal joint.

As shown in FIGS. 1 and 2, three axially extending track grooves 2 are formed in an inner periphery of an outer ring 1 at intervals of 120 degrees. Also, axially extending raceway grooves 3 are formed in side faces of each track groove 2, which oppose each other in a circumferential direction of the outer ring 1.

A tripod member 4 is mounted in the outer ring 1 and formed with three trunnions 5 at positions corresponding to the track grooves 2. A guide block 6 is supported on each trunnion 5. To support the guide blocks 6, a spherical surface 5a is formed on each trunnion 5 and the trunnions 5 are inserted in cylindrical holes 7 formed in the guide blocks 6. Each guide block 6 is pivotable in any direction relative to the trunnion 5.

In both side faces of each guide block 6, a pair of raceway grooves 8 opposing the raceway grooves 3 formed in both side faces of each track groove 2 of the outer ring 1 are formed. Between opposed raceway grooves 3 and 8, rolling elements 9 comprising a plurality of balls are mounted.

The rolling elements 9, which are arranged in an axial direction of the outer ring 1 on both sides of each guide block 6, are retained by a retainer 10. Each retainer 10 is provided with retaining plate portions 10b for retaining the rolling elements 9 on both sides of a plate portion 10a arranged between an inner surface 11 of each track groove 2 and the outer face 12 of each guide block 6.

As described above, by mounting a plurality of rolling elements 9 between the raceway grooves 3 formed in side faces of each track groove 2, and the raceway grooves 8 formed in side faces of each guide block 6, it is possible to maintain constant a position of the guide blocks 6. Thus, when the outer ring 1 and the tripod member 4 form a working angle, slip develops at a contact portion of the spherical outer surface 5a of the trunnion 5 in a respective cylindrical hole 7 of a respective guide block 6, so that the trunnion 5 inclines relative to the axis of the cylindrical hole 7.

Thus, when torque is transmitted with the outer ring 1 and the tripod member 4 forming a working angle, the guide blocks 6 move in the axial direction of the outer ring along the track grooves 2 while maintain a constant position.

While the guide blocks 6 are moving, the rolling elements 9 move, while rolling, by contact with the raceway grooves 3 and 8, so that the moving resistance of the guide blocks 6 is extremely small. Thus, the guide blocks 6 will slide smoothly, so that during sliding, vibration is scarcely produced.

A moving distance of the rolling elements 9 during sliding of the guide blocks 6 is half of a moving distance of the guide blocks 6 if slipping at contact portions with the raceway grooves 3 and 8 is ignored. If there is a difference in the moving distance between the rolling elements 9 and the retainers 10, slip of the rolling elements 9 can occur, so that vibration is produced.

If the retainers 10 for retaining the rolling elements 9 are simply mounted between the side faces of respective track grooves 2 and side faces of respective guide blocks 6, there is a fear that the retainers 10 may shift in the axial direction and fall off due to slipping at the contact portions of the rolling elements 9 in the raceway grooves 3 and 8, or due to vibration of an automobile in which is mounted a constant-velocity universal joint.

In order that all of the rolling elements 9 make a pure rolling motion and will not fall from between the raceway grooves 3 and 8, a moving distance of the retainers 10 is restricted to half of the moving distance of the guide blocks 6 by virtue of moving distance restricting mechanisms 20.

Figure 3:
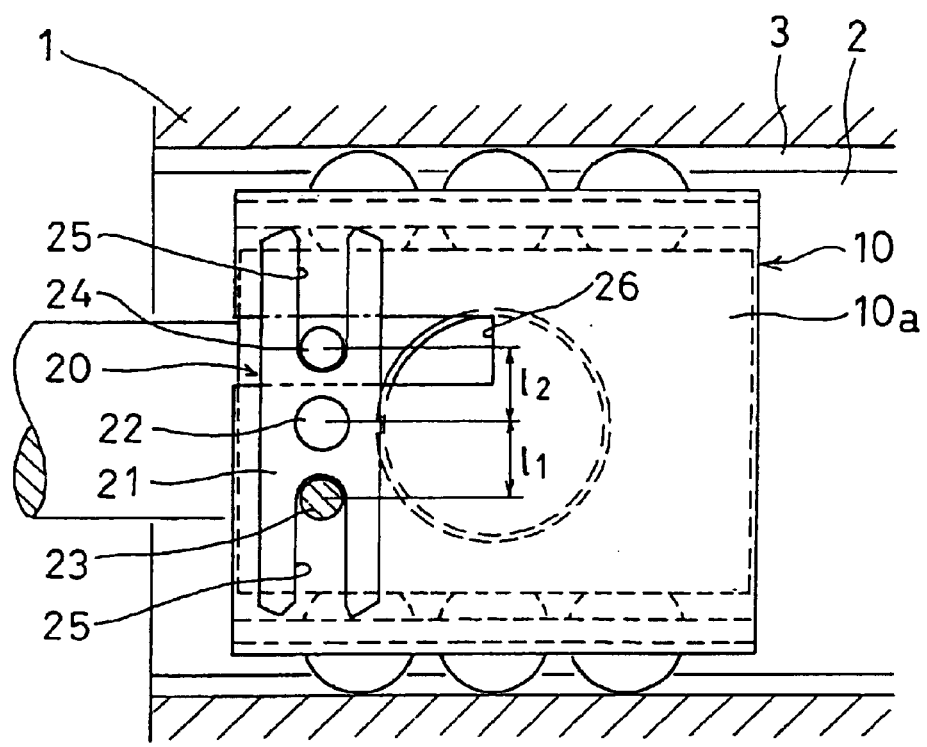
FIG. 3 is a sectional view taken along III—III of FIG. 2.

As shown in FIGS. 2 and 3, each moving distance restricting mechanism 20 is provided with a flat plate-shaped lever 21 on an outer surface of the plate portion 10a of a respective retainer 10. The lever 21 is pivotable supported by caulking an end of a headed pin 22 such as a rivet that extends through both a central portion of the lever 21 and the plate portion 10a, to couple the lever 21 to the retainer 10. A protrusion 23 comprising a pin secured to the outer ring 1, and a protrusion 24 secured to the guide block 6, are inserted in guide grooves 25 formed in the lever 21 so that the distances $l_1$ and $l_2$ from the respective protrusions 23, 24 to a pivotal center of the lever are equal to each other. A cutout 26 into which the protrusion 24, secured to the guide block 6, is inserted is formed in the plate portion 10a of the retainer 10 so that the guide block 6 and the retainer 10 can move relative to each other.

Figure 4A:
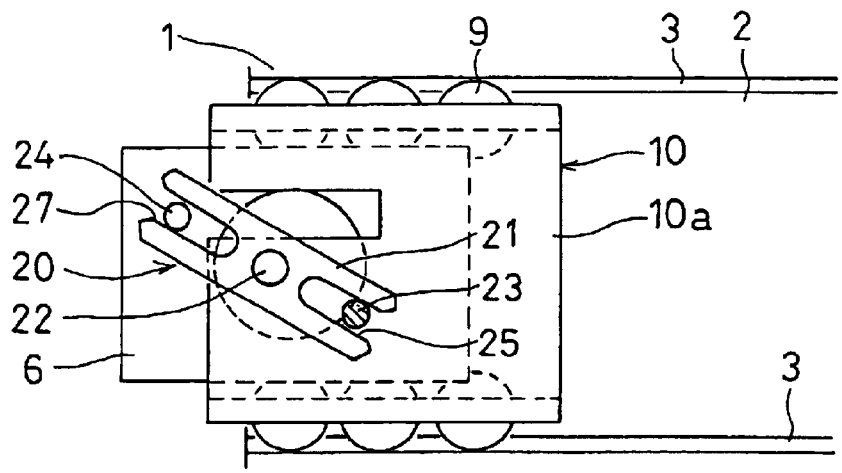
FIGS. 4A–4C are views showing positional relationships between the outer ring, retainer and guide block.
Figure 4B:
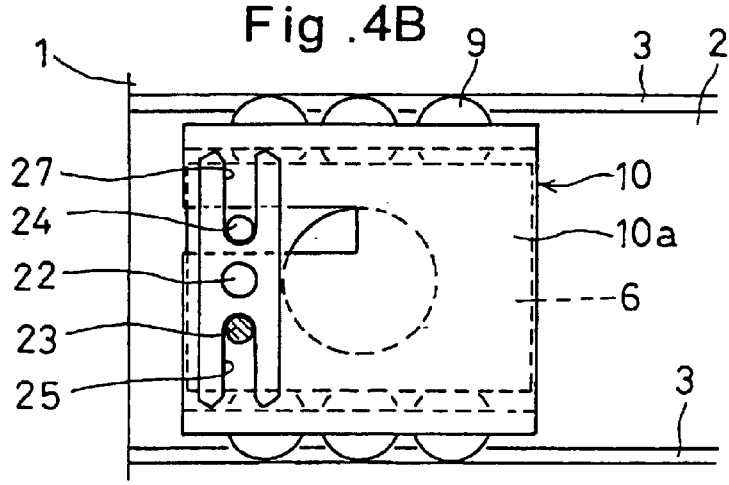
Figure 4C:
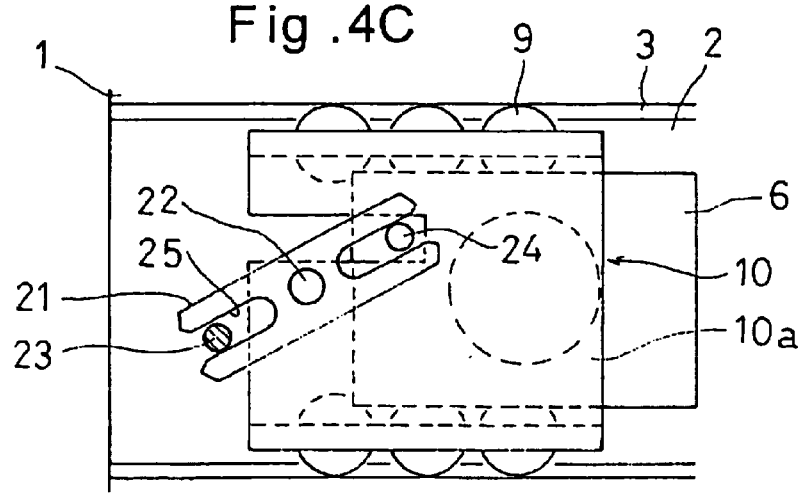

With the moving distance restricting mechanisms 20 having such a structure, since the ratio of the distance from the protrusion 23 on the outer ring 1 to the pivotal center of the lever 21 to a distance from the protrusion 23 on the outer ring 1 to the protrusion 24 on the guide block 6 is 1:2, while the guide block 6 moves from the state shown in FIG. 4A to the state shown in FIG. 4C, the retainer 10 moves by half of the moving distance of the guide block 6. Thus, it is possible to make the moving distance of the retainer 10 equal to the moving distance of the rolling elements 9, which move by contact with the raceway grooves 3 and 8.

Thus, the plurality of rolling elements 9 are always in a rolling state over an entire moving range of each guide block 6, so that it is possible to achieve good NVH (noise, vibration and harshness) properties.

Also, since it is only necessary to ensure a distance sufficient to receive the lever 21 and the plate portion 10a of the retainer 10 between the inner surface 11 of the track groove 2 and the outer surface 12 of the guide block 6, it is possible an increase in the size of the outer ring 1, and thus to provide a compact constant-velocity universal joint.

Further, by forming the lever 21 into a flat plate shape, it can be easily formed by pressing.

Also, since the retainer 10 and the lever 21 are coupled together by caulking the pin 22, assembling of the tripod type constant-velocity universal joint becomes easier.

Figure 5:
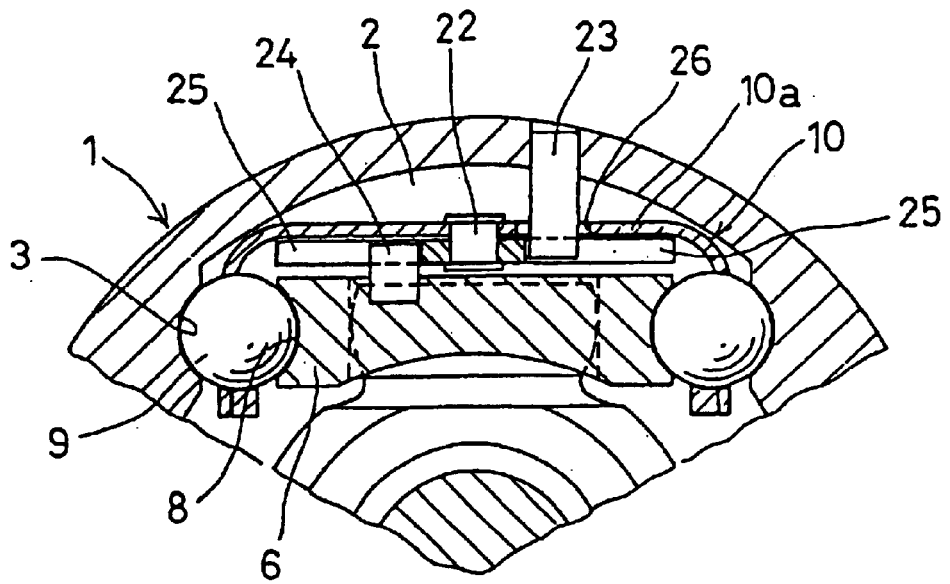
FIG. 5 is a partially cutaway side view of another embodiment of the tripod type constant-velocity universal joint.

In FIGS. 2 and 3, the flat plate-shaped lever 21 is provided on the outer side of the plate portion 10a of the retainer 10. But as shown in FIG. 5, it may be provided on an inner side of the plate portion 10a. In this case, a cutout 26 in which is inserted the pin 23 on the outer ring 1 is formed in the plate portion 10a so that the guide block 6 and the retainer 10 can move relative to each other.

Figure 6:
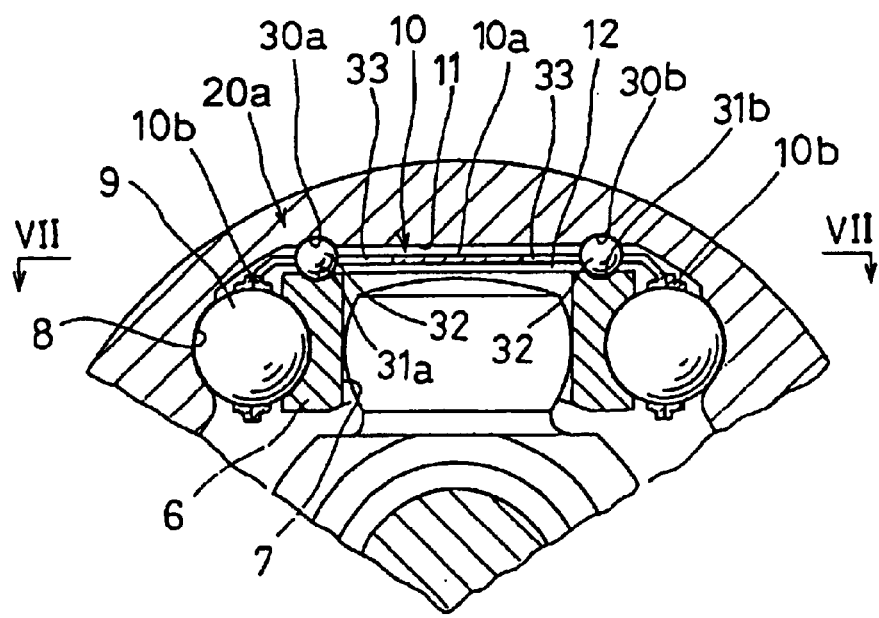
FIG. 6 is a similar view of a further embodiment.
Figure 7:
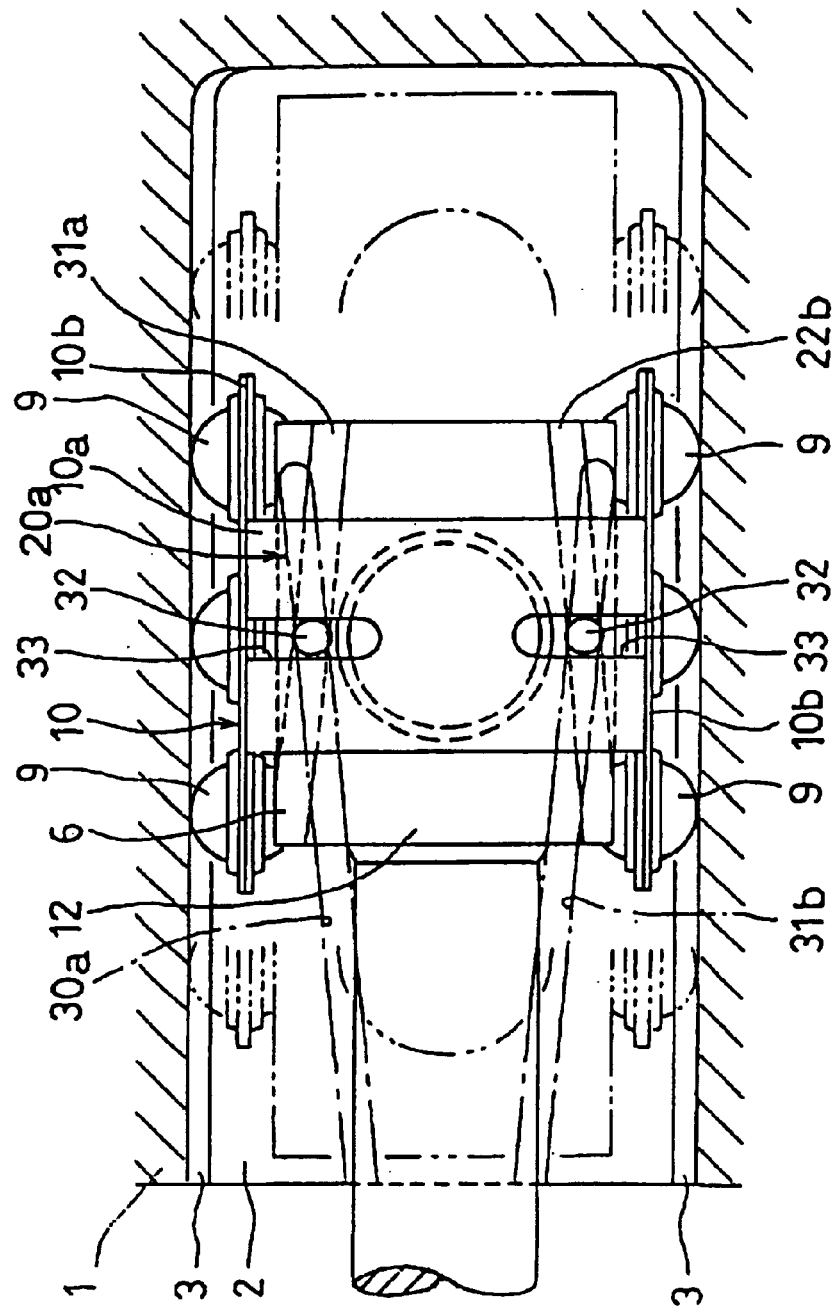
FIG. 7 is a sectional view taken along line VII—VII of FIG. 6.

FIGS. 6 and 7 show another embodiment of each moving distance restricting mechanism. For each moving distance restricting mechanism 20a, in the inner surface 11 of the track groove 2 are formed a pair of inclined grooves 30a, 30b extending axially and slant in opposite directions to each other. A radially outer surface of the guide block 6 is formed with inclined grooves 31a, 31b that slant in opposite directions relative to the inclined grooves 30a, 30b so as to be opposed to the inclined grooves 30a, 30b. At crossing points between the inclined grooves 30a, 30b on the outer ring 1 and the inclined grooves 31a, 31b on the guide block 6, balls 32 are accommodated and supported in a pair of guide grooves 33 formed in plate portion 10a of the retainer 10. The guide grooves 33 extend in a direction perpendicular to the direction in which the retainer 10 moves. The balls 32 can move along the guide grooves 33.

As described above, by provision of the inclined grooves 30a, 30b, 31a and 31b and by supporting the balls 32 at intersections of the inclined grooves 30a, 30b, 31a and 31b with the guide grooves 33 formed in the plate portion 10a so as to be movable in a direction perpendicular to the moving direction of the retainer 10, when the guide block 6 moves along the track groove 2, it is possible to move the retainer 10 by half of the moving distance of the guide block 6. Thus, it is possible to make a moving distance of the retainer 10 equal to a moving distance of the rolling elements 9, which move while rolling, by contact with raceway grooves 3 and 8.

Thus, the rolling elements 9, which bear the loads, are always in a rolling state, so that it is possible to achieve good NVH properties over the entire moving range of each guide block 6.

In order to allow all of the rolling elements 9 of the tripod type constant-velocity universal joints shown in FIGS. 2 and 6 to make purely rolling movement, the following conditional formulas have to be met. A position of each trunnion 5, which determines a positional relation between a corresponding guide block 6 and the outer ring 1, is set to substantially a center of a sliding range in a reference position (in which the lever 21 is not inclined, but rather perpendicular to a moving direction of the guide block 6).

$$K=(n-1)\cdot A+L/2 \qquad \text{formula (1)}$$

$$B>A \text{ when } n=2, B>2A \text{ when } n \geq 3 \qquad \text{formula (2)}$$

Figure 8:
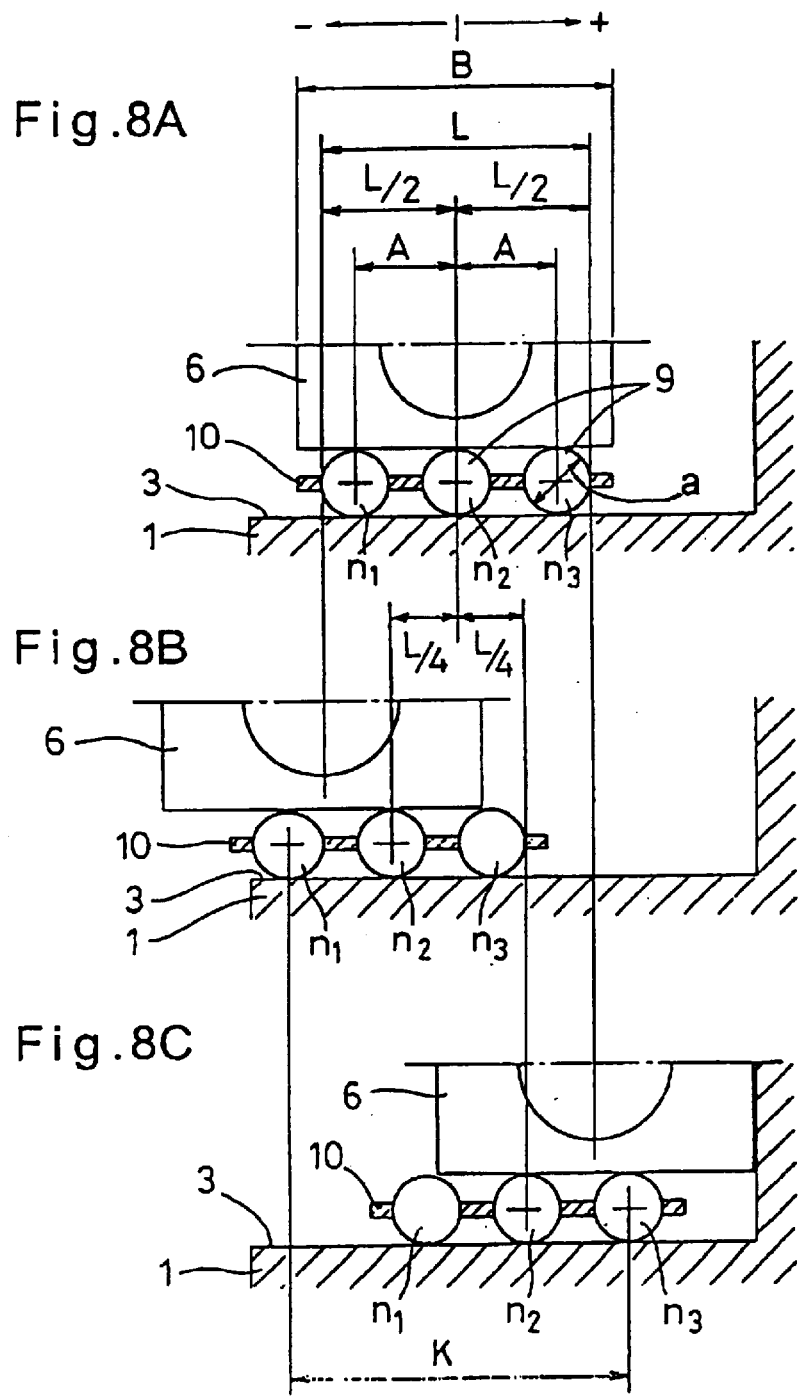
FIGS. 8A–8C are views for explaining how a length of a track groove of the outer ring is determined.

Symbols shown in FIGS. 8A–8C are as follows:
a: Diameter of the rolling elements 9
A: Pitch between the rolling elements 9 in each retainer 10
B: Length of the guide blocks 6
L: Required moving distance of the guide blocks 6
K: Length of the track groove of the outer ring
n: Number of rolling elements mounted in one raceway groove
nJ: rolling element number (J=1–n)

The following prerequisites are needed:
① A load center of the tripod member in each guide block is at a longitudinal center.
② A center of each guide block 6 is not outside of the rolling elements at both ends.
③ There are always two or more loaded rolling elements (n≧2).
④ Rolling element pitches are equal to each other and longer than the diameter of the rolling element (A>a).

When turning torque is transmitted with the tripod type constant-velocity universal joint forming a maximum working angle, each guide block 6 moves right and left by equal distances from a reference position of FIG. 8A to position shown in FIGS. 8B and 8C. Assuming that a necessary moving distance of the guide block 6 is L, ① A moving distance of the guide block to one side is L/2, and ② A moving distance of the retainer 10 to one side is L/4.

③ Expressing a position of each rolling element 9 by a numerical formula when the guide block 6 is at the reference position of FIG. 8A $$-(n-1) \cdot A/2 + (J-1) \cdot A \qquad \text{formula ①}$$

④ In order to allow all of the rolling elements 9 to make a rolling motion over the entire moving range of the guide block 6, when the retainer 10 has moved −L/4 (the state shown in FIG. 8B), the guide block 6 must not fall off the rolling elements 9. For this purpose, it is necessary to satisfy the following three conditions i)-iii).

i) The right-hand end of the guide block 6 has to be on the right-hand side of the n2 rolling element.

From the formula ①, the position of the n2 rolling element when the retainer 10 has moved −L/4 can be expressed as follows from the formula ①, $$-(n-1) \cdot A/2 + (J-1) \cdot A - L/4 \qquad \text{formula ②}$$

On the other hand, expressing a position of the right-hand end of the guide block by a numerical formula, $$-\frac{L}{2} + \frac{B}{2} = \frac{B-L}{2} \qquad \text{formula ③}$$

Thus, in order to satisfy the conditions i), from the formulas ②, ③, the following has to be satisfied:

$$-(n-1) \cdot A/2 + (2-1) \cdot A - L/4 < (B-L)/2$$

Simplifying this formula;

$$(3-n) \cdot A < B - L/2 \qquad \text{formula ④}$$

ii) The center of the guide block 6 has to be on the right-hand side of the n1 rolling element.

The position of the n1 rolling element when the retainer 10 has moved −L/4 can be expressed from the formula ① as follows:

$$(n-1) \cdot A/2 + (J-1) \cdot A - L/4 \qquad \text{formula ⑤}$$

On the other hand, expressing the central position of the guide block 6 by a numerical formula, $$-L/2 \qquad \text{formula ⑥}$$

Thus, in order to satisfy the conditions ii), from formulas ⑤, ⑥, the following must be satisfied.

$$-(n-1) \cdot A/2 + (J-1) \cdot A - L/4 < -L/2$$

Simplifying this formula;

$$(1-n) \cdot A/2 - L/4 < -L/2 = (1-n) \cdot A < -L/2 \qquad \text{formula ⑦}$$

iii) If n=2, B>A has to be met, and if n≧3, B>2A has to be met.

⑤ With the conditions i), ii), iii) satisfied, the length K of the raceway grooves 3 of the outer ring 1 will be twice the n1 rolling element when the retainer 10 has moved by −L/4.

From formula ①, the position of the n1 rolling element when the retainer 10 has moved −L/4 can be expressed as follows:

$$-(n-1) \cdot A/2 + (1-1) \cdot A - L/4 = -(n-1) \cdot A/2 - L/4$$

Thus, the length K of the raceway grooves 3 will be:

$$K = 2 \cdot |-(n-1) \cdot A/2 - L/4|$$
$$= (n-1) \cdot A + L/2$$

Thus, it is possible to obtain the length K of the raceway grooves 3 of the outer ring.

For reference, if a tripod type constant-velocity universal joint in which L=40 mm, n=3 and a=10 mm is to be designed, A will be A>10 mm from formula ⑦, and Assuming that A=15 mm, B will be B>30 mm from B>2A.

Thus, K=50 mm

But in determining a cup length of the outer ring, the length K of the outer ring raceway groove and interference lengths of an outer ring inlet side and deeper side have to be taken into consideration. Thus the cup length of the outer ring has to be at least K+B/2.

From the necessary moving distance of the guide block 6, the number n of the rolling elements, the length B of the guide block and the length K of the outer ring raceway grooves are determined. Since the guide block length and the outer ring raceway groove length vary with the number of rolling elements, optimum conditions are determined.

Normally, each guide block 6 has a necessary moving distance of 40 mm or over. Thus, assuming that L=40 mm and the symbol >1.1 times, the pitch A of the rolling elements, length B of the guide block, and length K of the outer ring raceway grooves for n=2, 3 and 4 will be as shown in Table 1.

TABLE 1

| n | A (mm) | B (mm) | K (mm) | K +B/2 (mm) |
|---|--------|--------|--------|-------------|
| 2 | 22     | 44     | 42     | 64          |
| 3 | 11     | 24.2   | 42     | 54.1        |
| 4 | 11     | 24.2   | 42     | 54.1        |

Thus, if n=2, both the guide block and outer ring cup length will be long. If n=4, the number of rolling elements is large. The number n of the rolling elements is preferably 3.

Figure 9:
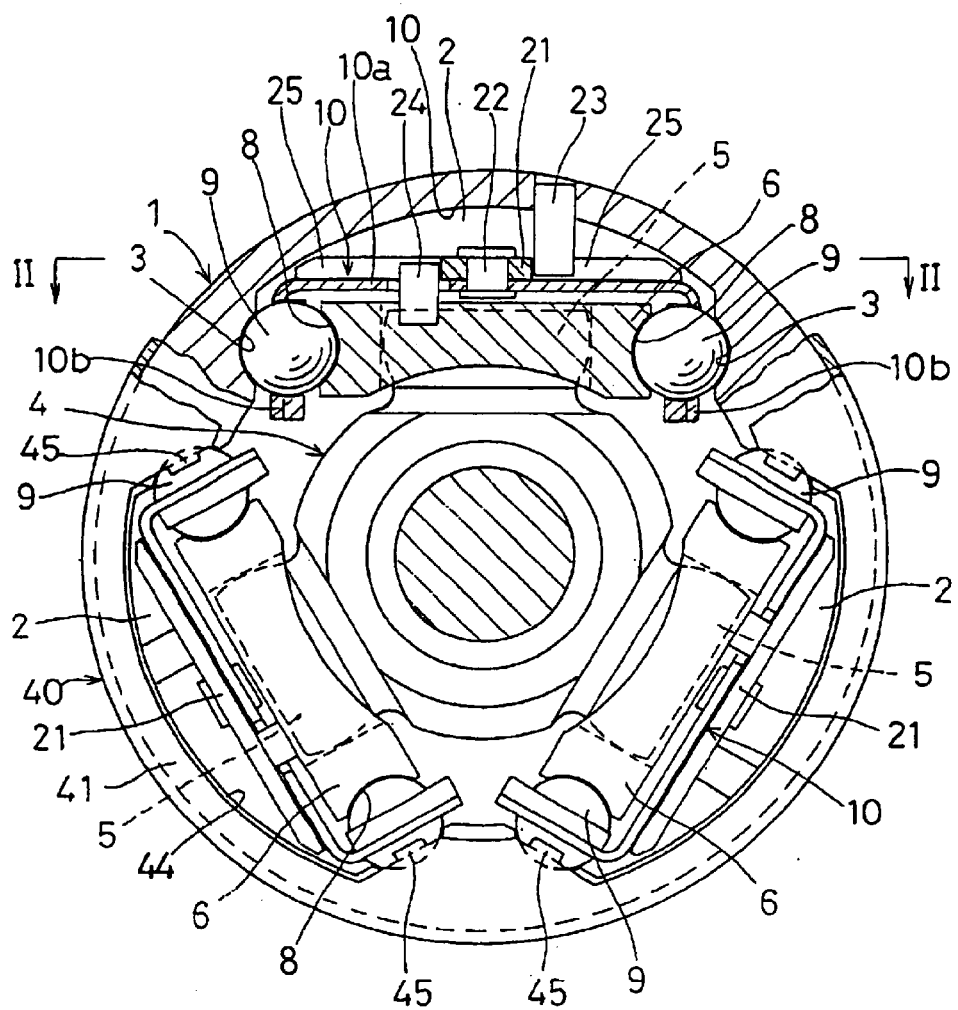
FIG. 9 is a partially cutaway front view showing another embodiment of the tripod type constant-velocity universal joint according to this invention.
Figure 10:
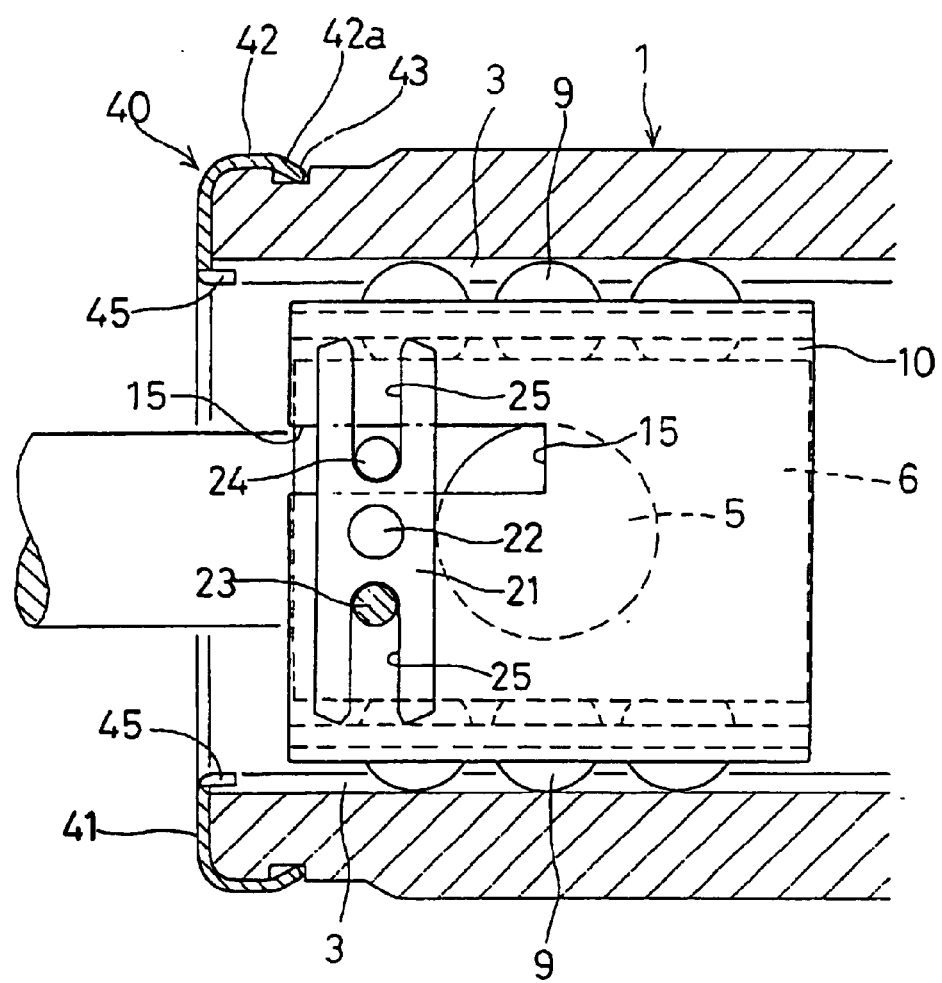
FIG. 10 is a sectional view along line II—II of FIG. 9.
Figure 11:
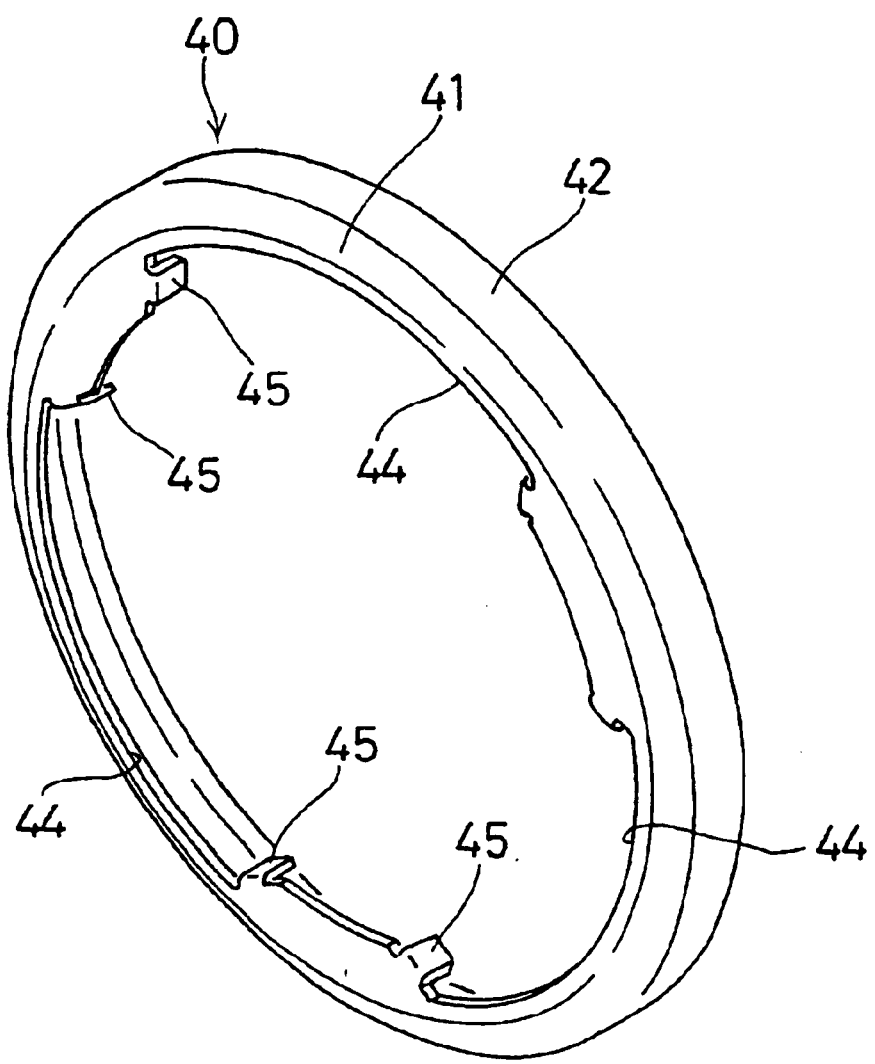
FIG. 11 is a perspective view showing a stopper ring of the embodiment of FIG. 9.

FIGS. 9 to 12 show the second embodiment of the tripod constant-velocity universal joint. It differs from the embodiments of FIGS. 1, 5 and 6 in that a stopper ring 40 formed by pressing a metallic plate is provided at an open end of the outer ring 1. As shown in FIGS. 9–11, stopper ring 40 has an annular plate portion 41 abutting an end of the outer ring 1. On an outer periphery of the annular plate portion 41, a cylindrical portion 42 is provided and pressed on the open end of the outer ring 1. The rear end of the cylindrical portion 42 is caulked inwardly. An annular bent portion 42a formed by caulking engages in a groove 43 formed in an outer periphery of the outer ring 1. The engagement prevents the stopper ring 40 from moving in the axial direction.

Cutouts 44 are formed at positions opposing the track grooves 2 of the outer ring 1 (FIG. 11). Protrusions 45 provided on both sides of each cutout 44 are inserted in the raceway grooves 3 formed in side surfaces of the track groove 2.

Figure 12:
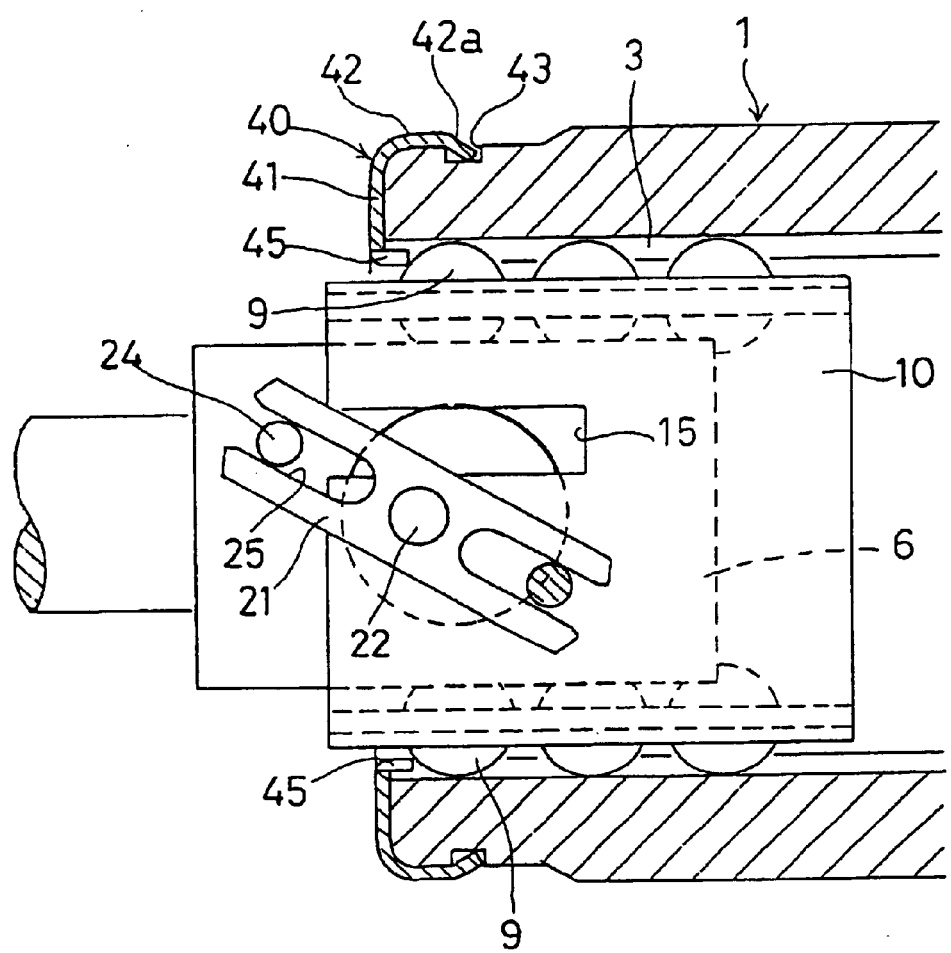
FIG. 12 is a sectional view showing how the tripod member is prevented from coming out.

By mounting the stopper ring 40 having the above-described structure on the open end of the outer ring 1, when tripod member 4 moves toward the open end of the outer ring 1 as shown in FIG. 12, the rollers 9 will abut the protrusions 45 provided on the stopper ring 40. This abutment prevents retainer 10 from coming off.

The lever 21 provided on the plate portion 10a of each retainer 10 is prevented from turning by engagement of a pin 23 on the outer ring 1 with a guide groove 25 formed in the lever 21 (FIG. 10). Since a pin 24 provided on each guide block 6 is engaged in another guide groove 25 formed in the lever 21, the guide blocks 6 and the tripod member 4, which supports the guide blocks 6, are prevented from coming out of the open end of the outer ring 1.

Figure 13:
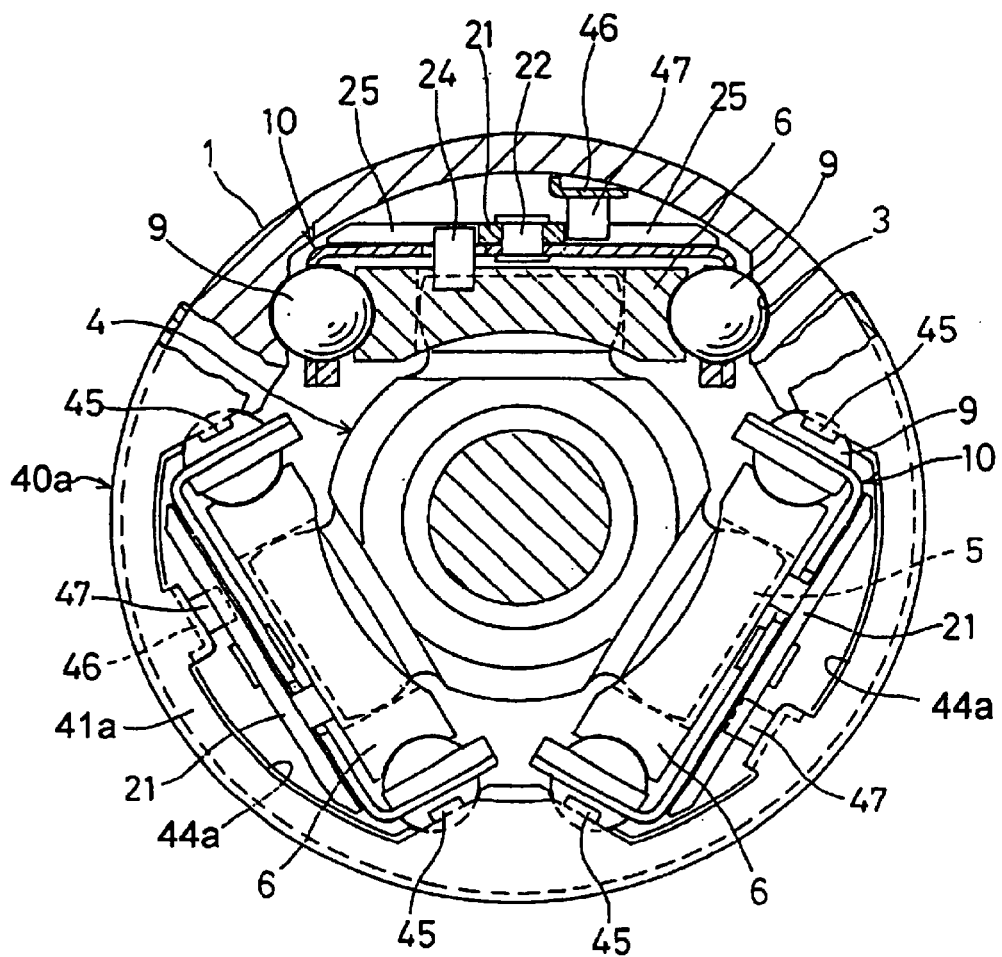
FIG. 13 is a partially cutaway front view showing another embodiment of the tripod type constant-velocity universal joint.
Figure 14:
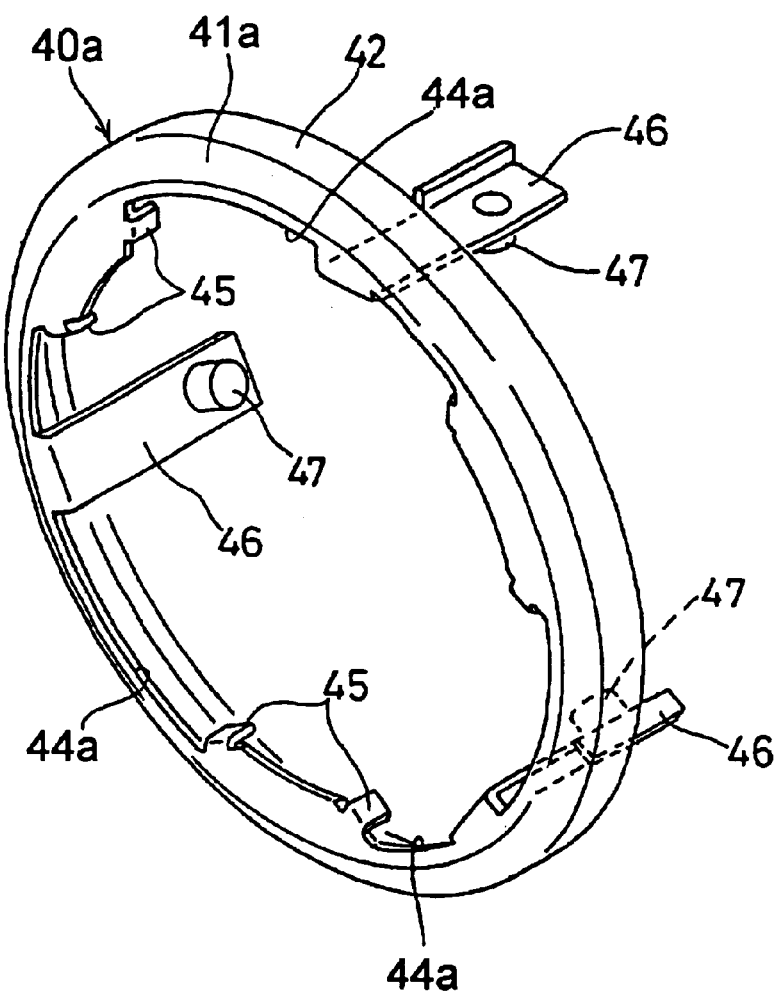
FIG. 14 is a perspective view showing a stopper ring of the embodiment of FIG. 13.

FIGS. 13 and 14 show another embodiment of the stopper ring for preventing the tripod member 4 from coming out. The stopper ring 40a of this embodiment differs from the stopper ring 40 shown in FIG. 12 in that the stopper ring 40a is provided with three pin-forming pieces 46 in respective cutouts 44a formed in the stopper ring 40a so as to be inserted in respective track grooves 2 of the outer ring 1 and that a pin 47 is formed on the pin-forming piece 46 by pressing so as to be inserted into one guide groove 25 of lever 21. Thus, to the same portions as those of the stopper ring 40 shown in FIG. 12, the same numerals are used, and their description is omitted.

As described above, by providing the pin 47 on each pin-forming piece 46, the pins 23 shown in FIG. 9 can be eliminated, so that the number of parts decreases. This makes it possible to reduce cost. Also, since it is not necessary to fix the pins 23 to the outer ring 1, the tripod type constant-velocity universal joint is easier to assemble.

According to the present invention, a tripod type constant-velocity universal joint is designed so that all rolling elements will roll over the entire moving range of a corresponding guide block in an axial direction of an outer ring. Thus a tripod type constant velocity universal joint is provided which has good NVH properties.

Also, according to the present invention, length K of each track groove of the outer ring is determined to satisfy the formula K=(n−1)·A+L/2 wherein n is the number of the rolling elements mounted in one raceway groove, A is the pitch between the rolling elements, L is a required moving distance of each guide block, and length B of each guide block is longer than that of the pitch A between the rolling elements (B>A) if the number of the rolling elements is two and is longer than double the pitch A (B>2A), if the number of the rolling elements is three or more. This makes it possible to extremely easily provide a tripod type constant-velocity universal joint which has good NVH properties.

Also, by setting the number of the rolling elements mounted in one raceway groove to three, it is possible to provide a compact, light-weight tripod type constant-velocity universal joint which has a small axial length.

According to this invention, since the stopper ring is provided at the open end of the outer ring, it is possible to reliably prevent the tripod member from coming out of the open end of the outer ring.

Also, since the stopper ring is of a simple structure in which a plurality of cutouts are formed in an annular plate portion having a cylindrical portion on an outer periphery thereof, it can be formed easily by pressing a metallic plate.

What is claimed is:

1. A tripod type constant-velocity universal joint comprising:
    an outer ring formed with three axially extending track grooves in an inner periphery thereof;
    a tripod member mounted in said outer ring and having three trunnions formed thereon so as to oppose said track grooves, raceway grooves being formed in side faces of each of said track grooves and opposing each other in the circumferential direction of said outer ring, said raceway grooves extending in the axial direction of said outer ring;
    guide blocks respectively supported on said trunnions so as to be pivotable relative to said trunnions and respectively received in said track grooves, each of said guide blocks being formed with raceway grooves in side faces thereof so as to face said raceway grooves of said outer ring to thereby form a plurality of raceway groove pairs;
    a plurality of rolling elements mounted in said plurality of raceway groove pairs;
    retainers for retaining said rolling elements; and
    moving distance restricting mechanisms for restricting the moving distances of said retainers to half of the moving distances of said guide blocks, respectively;
    wherein said rolling members are arranged to roll over the entire moving range in the axial direction of said outer ring,
    wherein said retainers respectively have plate portions disposed between the inner surfaces of said track grooves and the outer surfaces of said guide blocks, and
    wherein each of said moving distance restricting mechanisms comprises a pivotable lever having its longitudinally central portion supported by said plate portion of said retainer, said pivotable lever being formed with a pair of guide grooves extending axially, and a pair of pins inserted in said guide grooves, one of said pair of pins being secured to said outer ring and the other being secured to a respective one of said guide blocks.

2. A tripod type constant-velocity universal joint as claimed in claim 1, wherein
    a stopper ring is mounted to an open end of said outer ring for preventing said rolling elements from coming out of said outer ring.

3. A tripod type constant-velocity universal joint as claimed in claim 2, wherein
    said stopper ring has an annular plate portion abutting the open end of said outer ring, a cylindrical portion provided on the outer periphery of said annular plate portion and fitted on the outer periphery of the open end of said outer ring, said annular plate portion being formed with cutouts at positions opposing the open ends of said track grooves, and protrusions provided on both sides of each of said cutouts and inserted in said raceway grooves of said outer ring to prevent said rolling elements from coming out of the open ends of said track grooves.

4. A tripod type constant-velocity universal joint as claimed in claim 3, wherein
    a pin-forming piece is formed on the inner periphery of each of said cutouts of said annular plate portion of said stopper ring so as to be inserted in each of said track grooves, and said pin secured to said outer ring is formed by pressing on each of said pin-forming pieces.

5. A tripod type constant-velocity universal joint as claimed in claim 4, wherein
    said stopper ring is formed by pressing a metallic plate.

6. A tripod type constant-velocity universal joint as claimed in claim 3, wherein
    said stopper ring is formed by pressing a metallic plate.

7. A tripod type constant-velocity universal joint as claimed in claim 2, wherein said stopper ring is formed by pressing a metallic plate.

8. A tripod type constant-velocity universal joint as claimed in claim 1, wherein a stopper ring is mounted to an open end of said outer ring for preventing said rolling elements from coming out of said outer ring.

* * * * *